W. S. ADAMS.
CAR TRUCK.
APPLICATION FILED MAR. 29, 1919.
1,325,226.
Patented Dec. 16, 1919.
2 SHEETS—SHEET 1.
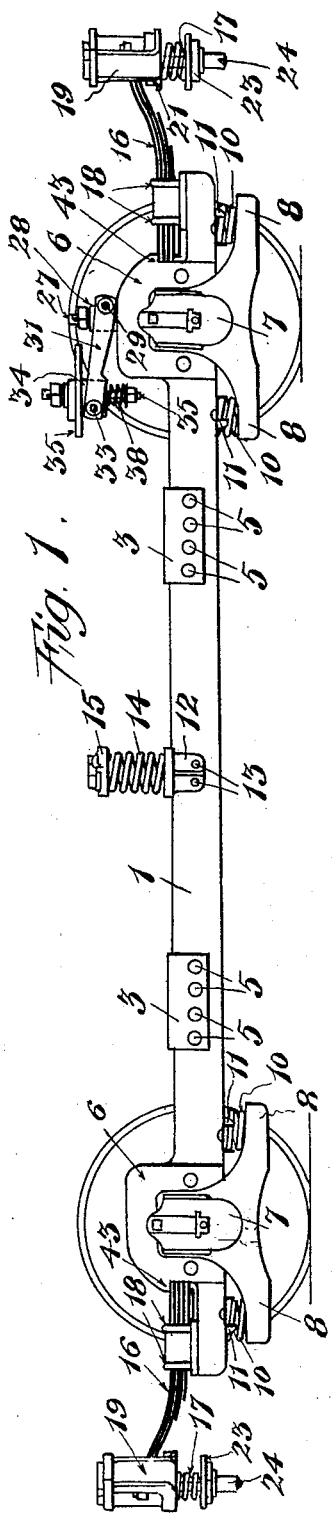
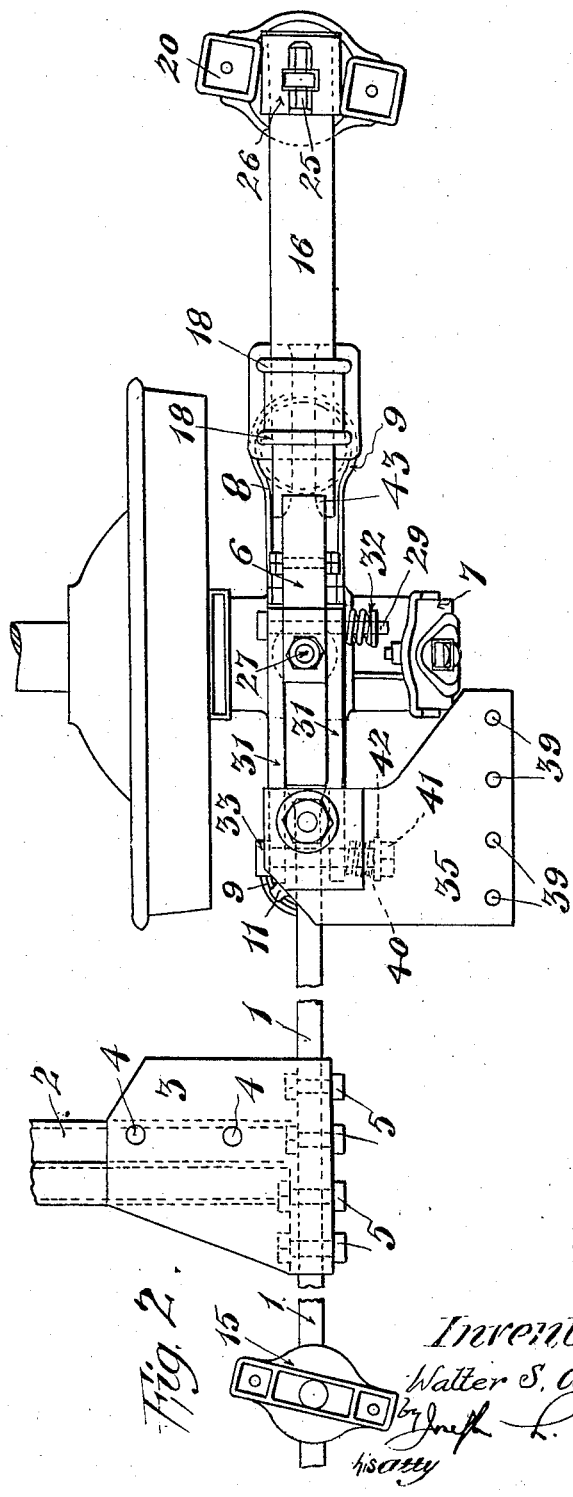
Inventor
Walter S. Adams

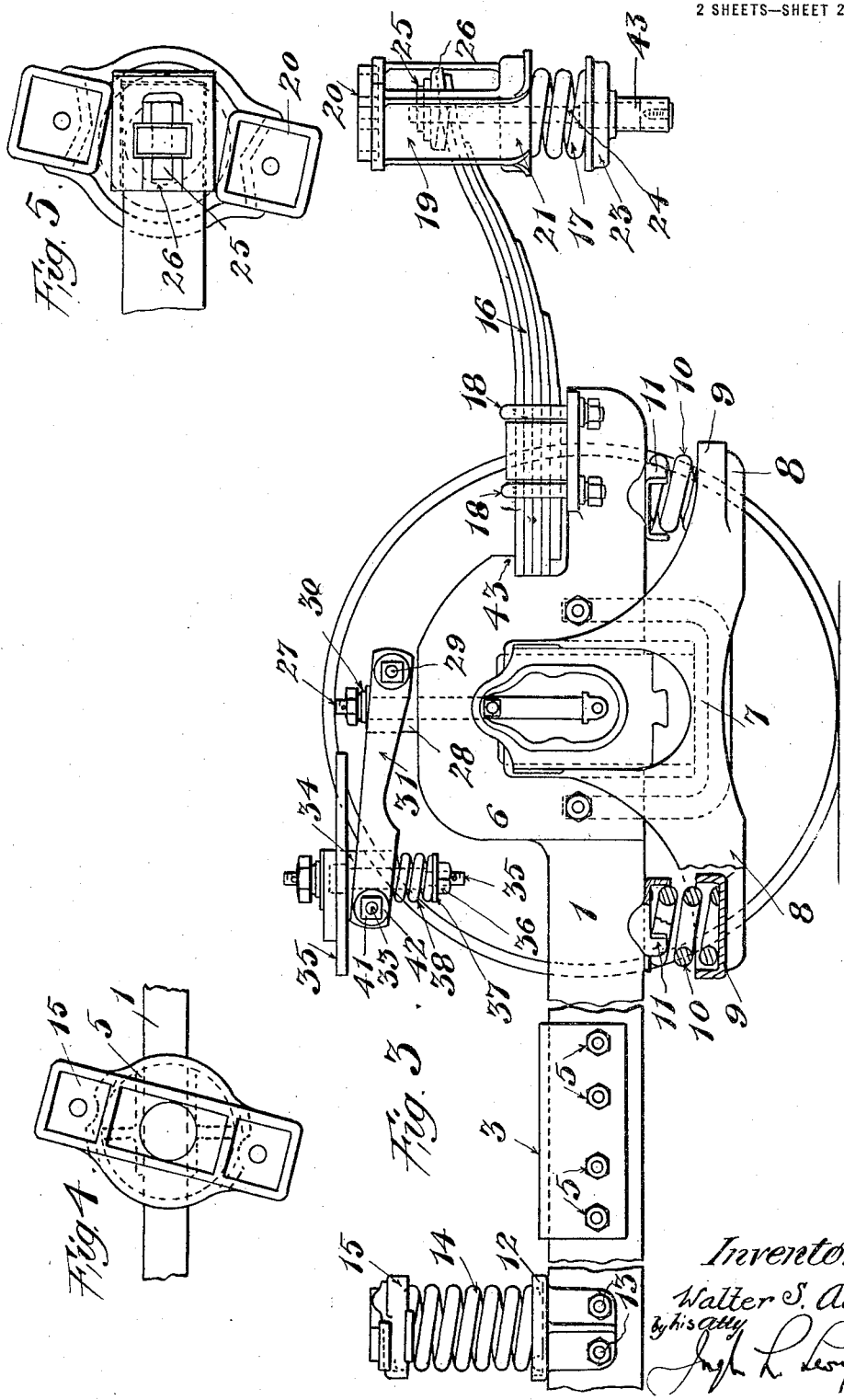

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,325,226.  Specification of Letters Patent.  Patented Dec. 16, 1919.

Application filed March 29, 1919. Serial No. 286,072.

*To all whom it may concern:*

Be it known that I, WALTER S. ADAMS, a citizen of the United States, and a resident of the city of Philadelphia, county of Philadelphia, and State of Pennsylvania, have invented a certain new and useful Improvement in Car-Trucks, of which the following is a specification.

The object of this invention is to provide a suitable car truck which will be light, durable and easy riding, and in every way suitable for light cars.

A further object of this invention is to provide a truck of this character, whereby it is possible to remove the wheels and axles from the truck readily and expeditiously, without disturbing the remainder of the truck, which remains attached to the car body.

With these objects, and other objects which may hereinafter appear, in view, I have devised the particular arrangement of parts hereinafter set forth, and more particularly pointed out in the claims appended hereto.

Reference is to be had to the accompanying drawing, forming part hereof, in which—

Figure 1 is a side elevation of my improved truck, with brake mechanism, and other mechanism omitted for the sake of clearness;

Fig. 2 is a plan view of one end of the truck;

Fig. 3 is a side elevation of the portion of the truck shown in Fig. 2;

Fig. 4 is a plan view of the central car body support; and

Fig. 5 is a plan view of one of the end supports for the car body.

Throughout the various views of the drawings, similar reference characters designate similar parts.

In the preferred embodiment of my invention, as disclosed in the accompanying drawing, 1 indicates one of the truck side frames, which is connected to the opposite side frame by crossings 2, secured to the side frames by gusset plates 3, which are held in place by bolts 4 and 5. The side frames 1 are provided with yokes 6 and axle boxes 7, mounted therein.

Each of the axle boxes 7 is provided with a pair of laterally projecting ears 8, and each ear has a seat 9, upon which rests a coil spring 10. Each side frame 1 is provided with caps 11, which rest upon the springs 10.

A central support for the car body consists of a seat 12, fixed upon the upper edge of the side frame by bolts 13, and this seat carries a coil spring 14, the upper end of which rests in a seat 15, which is adapted to be secured to the car body. The car body is further carried from the truck by means of quarter elliptic springs 16, and coil springs 17.

Each leaf spring 16 is attached to the truck frame at the ends thereof by suitable inverted U-bolts 18. The yoke 6 is provided with a transverse slot, and the end of the leaf spring rests in said slot whereby a part of the yoke forms an overlying lip 43, and prevents the inner end of the spring from raising up. This arrangement likewise removes the strain of holding down the spring from the bolts 18. The outer end of each leaf spring is mounted in a bracket 19, which is provided on its upper end with a plate 20, which affords a means for attaching this bracket 19 to the car body. The lower end of the bracket 19 is provided with a spring seat 21, which rests upon a coil spring 17, supported on a seat 23. This seat 23 is carried by a hanger 24, which is carried by the end of the leaf spring 16. The upper end of this hanger 24 passes through an opening in the leaf spring 16, and is carried upon a pin 25, resting in a bearing 26. The hanger 24 is threaded at its lower end to accommodate an adjusting nut 43 on top of which the spring seat 23 is supported. Thus it will be seen that by means of this nut 43 the seat 23 may be raised and lowered, or vertically adjusted, whereby the tension of the spring 17 may be altered as desired.

By the spring arrangement herein described, it will be seen that any light load will be properly carried by the coil springs, which are of less capacity than the plate springs, and heavy loads will be carried by the leaf springs exclusively.

To prevent the truck from getting out of alinement without materially increasing the weight of the car and truck to any appreciable extent, and to utilize the rigidity of the frame of the car, whereby all diagonal bracing of the truck may be eliminated, I provide suitable links which connect the car body and truck frame, one on each side of the truck at diagonally disposed corners. On a vertically projecting bolt 27, which extends from the truck frame, is mounted a block 28, and extending at right angles through the block 28 is a bolt 29. This bolt 29 extends through a pair of parallel links 31, one of which is placed on each side of the block 28. The block 28 is free to turn on the bolt 27, but is prevented from turning too freely by means of a coil spring 30, and the links 31 are provided with a coil spring 32, surrounding the bolt 29. The other ends of the links 31 are connected to a bolt 33, which passes through a second block 34, mounted on a depending bolt 35, which carries a nut 36, washer 37, and a coil spring 38, which forces the block 34 against a seat 35, which is in the form of a plate and is provided with holes 39 through which suitable bolts may be passed for attachment to the car body.

The bolt 33 is in all respects similar to the bolt 29, and is provided with a spring 40, nuts 41, and washers 42, for holding said spring in position.

Thus it will be seen that the links 31, blocks 28 and 34, and springs 30 and 38 prevent excessive side swing, because of the friction between the parts due to these springs and at the same time sufficient play is provided to permit the car body to ride easily on the truck at all times and especially on curves.

The brake rigging and motor supports may be carried in any suitable way, and made in any suitable form, but are preferably made and carried so that space is left for storage batteries or other devices as described.

The rigidity of the frame of the car body coöperates through the links 31, and the connected parts, so as to make the frames 1 of the truck remain secure and in alinement at all times. It will also be seen that by the construction shown and described, a ready removal of the axle boxes, wheels and axle is permitted.

From the foregoing, it is obvious that my invention is not to be restricted to the exact embodiment shown, but is broad enough to cover all structures coming within the scope of the annexed claims.

Having described my invention, what I claim is:

1. A truck having a side frame, yokes, axle boxes in said yokes, quarter elliptic springs mounted on the ends of said frame, means for holding said springs on said frame, links depending from the ends of said springs, a coil spring surrounding said link, a bracket adapted to be attached to the car body, said bracket being provided with a seat resting on said coil spring, and a seat on said link for supporting said coil springs with means on said link for vertical adjustment of said seat.

2. A truck having a side frame, yokes, axle boxes in said yokes, a bolt on top of each of said yokes, a block on said bolt, links on each side of said block, means extending from the car body on which the ends of said links are pivotally mounted, quarter elliptic springs with their ends resting on the truck frame adjacent its ends, and inverted U-bolts for securing said springs on the frame.

3. A truck having a side frame, yokes, an axle box in each yoke, and a leaf spring supported by the frame at each end thereof, with the inner end of each of said springs held under a lip on the axle box yoke.

4. A truck having a side frame, a yoke, a leaf spring secured on the end of said frame, said yoke being provided with a transverse slot to form a lip adapted to overlie on the inner end of said leaf spring.

Signed at the city and county of Philadelphia, State of Pennsylvania, this 27th day of March, 1919.

WALTER S. ADAMS.